US010329922B2

(12) United States Patent
Martinello et al.

(10) Patent No.: US 10,329,922 B2
(45) Date of Patent: Jun. 25, 2019

(54) GAS TURBINE ENGINE AIRFOIL

(71) Applicant: General Electric Company, Schenectady, NY (US)

(72) Inventors: Peter Frank Martinello, Cincinnati, OH (US); Stephen Mark Molter, Cincinnati, OH (US); Brian David Keith, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 257 days.

(21) Appl. No.: 15/018,977

(22) Filed: Feb. 9, 2016

(65) Prior Publication Data

US 2017/0226868 A1    Aug. 10, 2017

(51) Int. Cl.

| F01D 5/18 | (2006.01) |
|---|---|
| F01D 25/12 | (2006.01) |
| F01D 5/30 | (2006.01) |
| F01D 9/04 | (2006.01) |
| F01D 11/10 | (2006.01) |

(52) U.S. Cl.
CPC ............. *F01D 5/186* (2013.01); *F01D 5/187* (2013.01); *F01D 11/10* (2013.01); *F05D 2240/304* (2013.01); *F05D 2240/307* (2013.01); *F05D 2260/22141* (2013.01); *Y02T 50/676* (2013.01)

(58) Field of Classification Search
CPC ........ F01D 5/186; F01D 5/3007; F01D 9/041; F01D 25/12; F05D 2240/125; F05D 2240/307; F05D 2220/32; F05D 2260/202; F05D 2260/22141
See application file for complete search history.

(56) References Cited

U.S. PATENT DOCUMENTS

| 3,635,585 | A | * | 1/1972 | Metzler, Jr. | ............... F01D 5/20 416/96 R |
|---|---|---|---|---|---|
| 3,854,842 | A | * | 12/1974 | Caudill | .................. F01D 5/147 415/116 |
| 4,390,320 | A | * | 6/1983 | Eiswerth | ................. F01D 5/005 29/889.1 |
| 5,503,527 | A | | 4/1996 | Lee et al. | |
| 5,733,102 | A | * | 3/1998 | Lee | ......................... F01D 5/187 415/115 |
| 6,059,530 | A | * | 5/2000 | Lee | ......................... F01D 5/145 416/96 A |
| 6,224,336 | B1 | * | 5/2001 | Kercher | ................. F01D 5/186 415/115 |
| 7,607,893 | B2 | * | 10/2009 | Lee | ......................... F01D 5/145 415/173.1 |
| 8,133,032 | B2 | * | 3/2012 | Tibbott | ..................... F01D 5/20 416/235 |
| 8,186,965 | B2 | | 5/2012 | Kuhne et al. | |
| 8,425,183 | B2 | * | 4/2013 | Lee | ......................... F01D 5/187 415/173.1 |
| 8,708,645 | B1 | * | 4/2014 | Liang | ....................... F01D 5/20 415/173.1 |

* cited by examiner

*Primary Examiner* — Igor Kershteyn
(74) *Attorney, Agent, or Firm* — McGarry Bair PC (57) ABSTRACT

An apparatus and method of cooling a tip of an airfoil for a gas turbine engine, includes a rib circumscribing the tip to define a tip plenum. A tip baffle partially divides the tip plenum, being spaced from the rib by a baffle slot. The rib includes a tip slot in fluid communication with the baffle slot to provide a flow of cooling fluid along the tip of the airfoil for exhausting out the tip slot.

24 Claims, 8 Drawing Sheets

GAS TURBINE ENGINE AIRFOIL

BACKGROUND OF THE INVENTION

Turbine engines, and particularly gas or combustion turbine engines, are rotary engines that extract energy from a flow of combusted gases passing through the engine onto a multitude of rotating turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Gas turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine can be around 1000° C. to 2000° C. and the cooling air from the compressor is around 500° C. to 700° C. While the compressor air is a high temperature, it is cooler relative to the turbine air, and can be used to cool the turbine.

Contemporary airfoils generally include a tip with a tip shelf. The tip shelf can have a tip baffle to improve airfoil efficiency associated with tip clearances. However, utilizing the tip baffle can generate pressures at the tip causing cooling fluid to wash out without properly cooling the airfoil tip.

BRIEF DESCRIPTION OF THE INVENTION

In one aspect, embodiments of the invention relate to an airfoil for a gas turbine engine including an outer surface bounding an interior and defining a pressure side and a suction side extending axially between a leading edge and a trailing edge to define a chord-wise direction, and extending radially between a root and a tip to define a span-wise direction. A rib projecting in the span-wise direction from a floor of the tip and extends in the chord-wise direction to at least partially bound an area of the floor to define a tip plenum. A tip slot located in the rib near the trailing edge fluidly couples to the tip plenum and a tip baffle, projecting in a span-wise direction from the floor and in a chord-wise direction within the tip plenum forms at least one baffle slot with the rib. The baffle slot fluidly couples to the tip slot.

In another aspect, embodiments of the invention relate to a method of cooling a tip of a rotating airfoil for a gas turbine engine including emitting cooling air through multiple openings in a floor of the tip and into at least two pockets on the tip, laterally constraining the cooling air within at least one of the pockets with a baffle projecting from the floor, and directing the cooling air through a baffle slot toward a tip slot near a trailing edge of the airfoil.

In yet another aspect, embodiments of the invention relate to an airfoil for a gas turbine engine including a tip having a tip plenum with an aft tip slot fluidly coupling the tip plenum to the exterior of the airfoil, a tip baffle forming at least two pockets within the plenum, and having a baffle slot fluidly coupled to the tip slot.

DESCRIPTION OF EMBODIMENTS OF THE INVENTION

The described embodiments of the present invention are directed to systems, methods, and other devices related to routing air flow in a turbine engine. For purposes of illustration, the present invention will be described with respect to an aircraft gas turbine engine. It will be understood, however, that the invention is not so limited and may have general applicability in non-aircraft applications, such as other mobile applications and non-mobile industrial, commercial, and residential applications.

Figure 1:
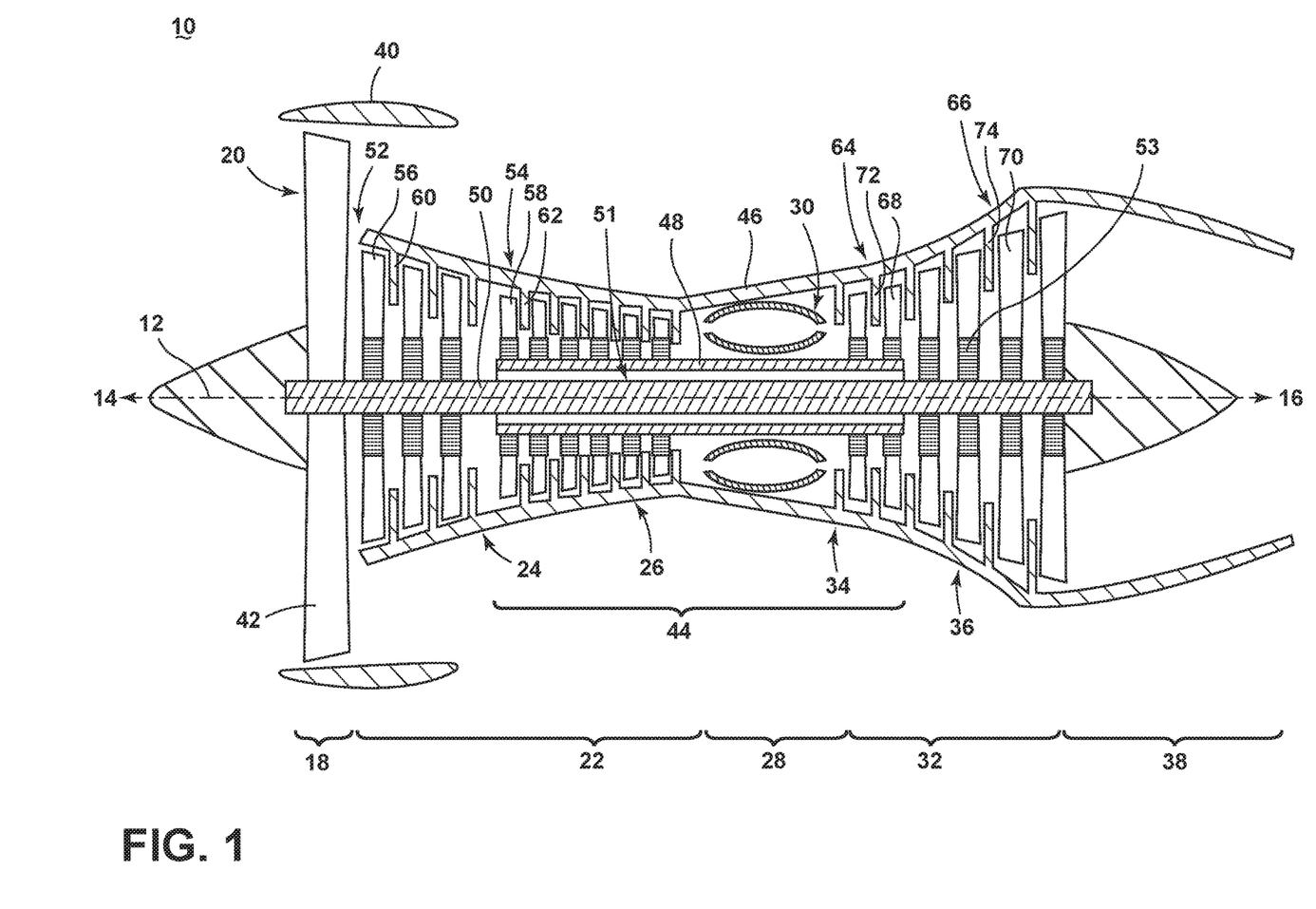
FIG. 1 is a schematic, sectional view of a gas turbine engine.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are also referred to individually or collectively as a rotor 51.

The LP compressor 24 and the HP compressor 26 respectively include a plurality of compressor stages 52, 54, in which a set of compressor blades 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, with each stage having its own disk. The vanes 60, 62 are mounted to the core casing 46 in a circumferential arrangement about the rotor 51.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26.

Figure 2:
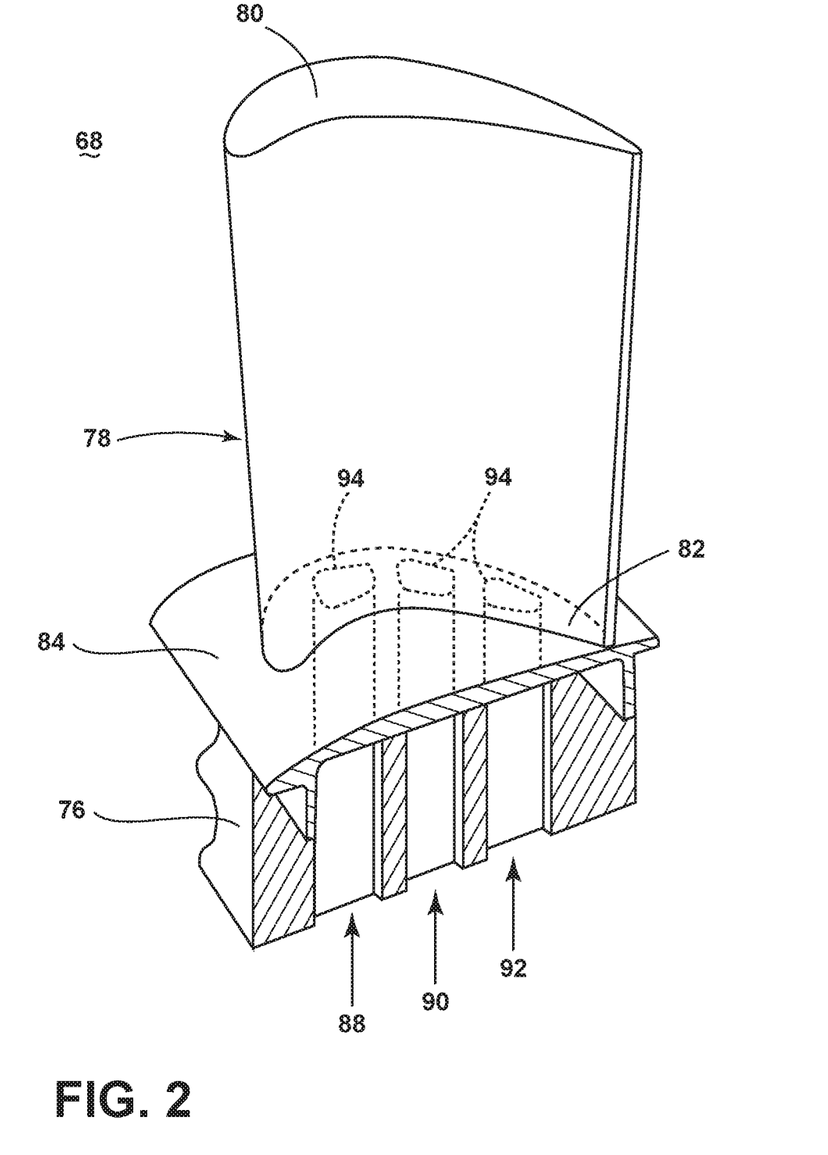
FIG. 2 is a perspective view of an airfoil for the engine of FIG. 1.

FIG. 2 is a perspective view of an engine component in the form of one of the turbine blades 68 of the engine 10 from FIG. 1. The turbine blade 68 includes a dovetail 76 and an airfoil 78. The airfoil 78 can be an airfoil 78 for either a blade or a vane for the turbine or compressor. The airfoil 78 extends from a tip 80 to a root 82 to define a span-wise direction. The dovetail 76 further includes a platform 84 integral with the airfoil 78 at the root 82, which helps to radially contain the turbine airflow. The dovetail 76 can be configured to mount to a turbine rotor disk on the engine 10. The dovetail 76 comprises at least one inlet passage, exemplarily shown as a first inlet passage 88, a second inlet passage 90, and a third inlet passage 92, each extending through the dovetail 76 to provide internal fluid communication with the airfoil 78 at a passage outlet 94. It should be appreciated that the dovetail 76 is shown in cross-section, such that the inlet passages 88, 90, 92 are housed within the body of the dovetail 76.

Figure 3:
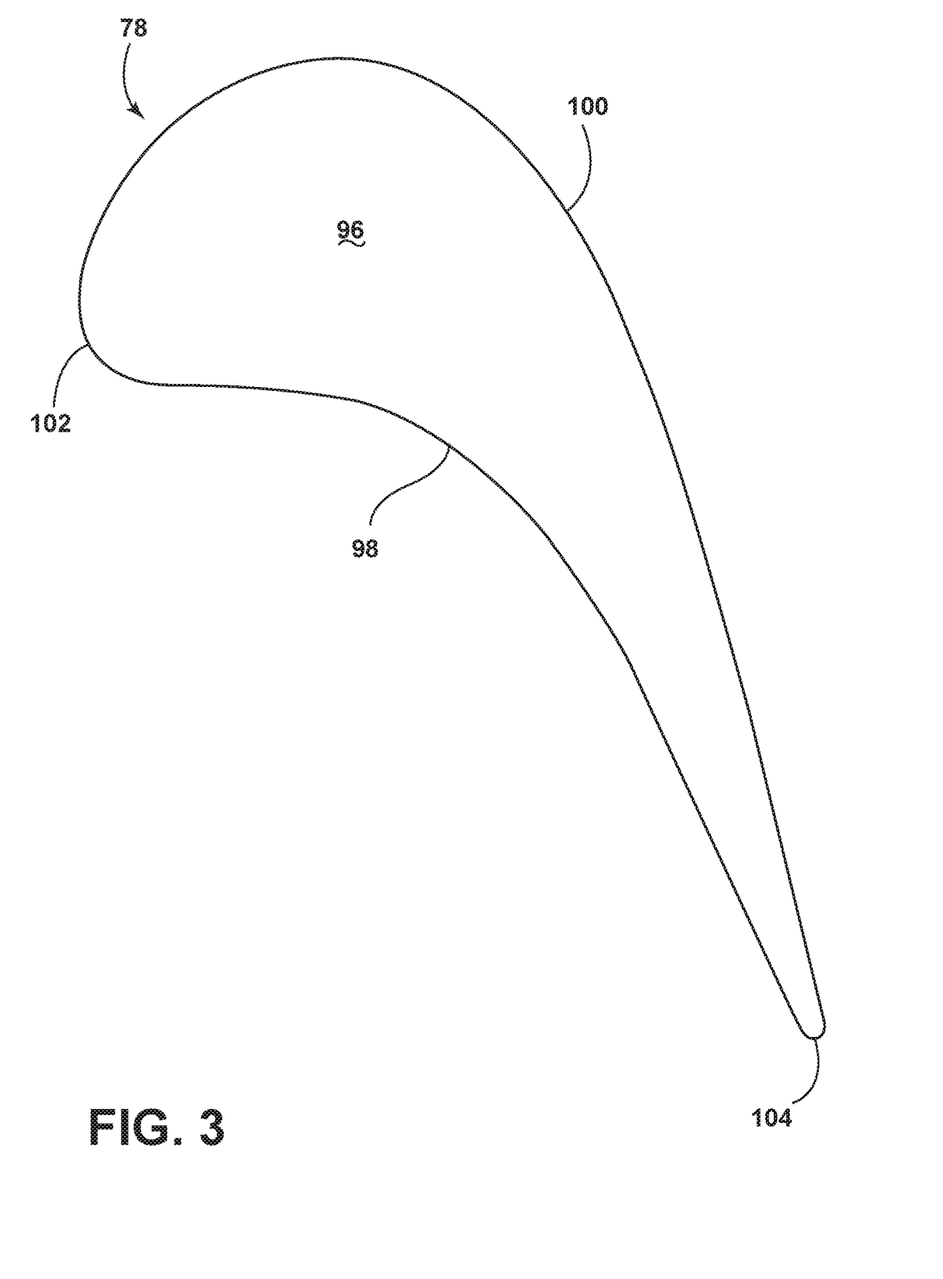
FIG. 3 is a cross-sectional view of the airfoil of FIG. 2.

Turning to FIG. 3, the airfoil 78, shown in cross-section, has a concave-shaped pressure sidewall 98 and a convex-shaped suction sidewall 100 extending axially between a leading edge 102 and a trailing edge 104 to define a chord-wise direction. The airfoil 78 can be a rotating blade or a stationary vane for the engine 10, and can be disposed in the compressor section 22 or the turbine section 32. The airfoil 78, being illustrated as an exemplary blade 68, rotates in a direction such that the pressure sidewall 98 follows the suction sidewall 100. Thus, as shown in FIG. 3, the airfoil 78 would rotate upward toward the top of the page.

Figure 4:
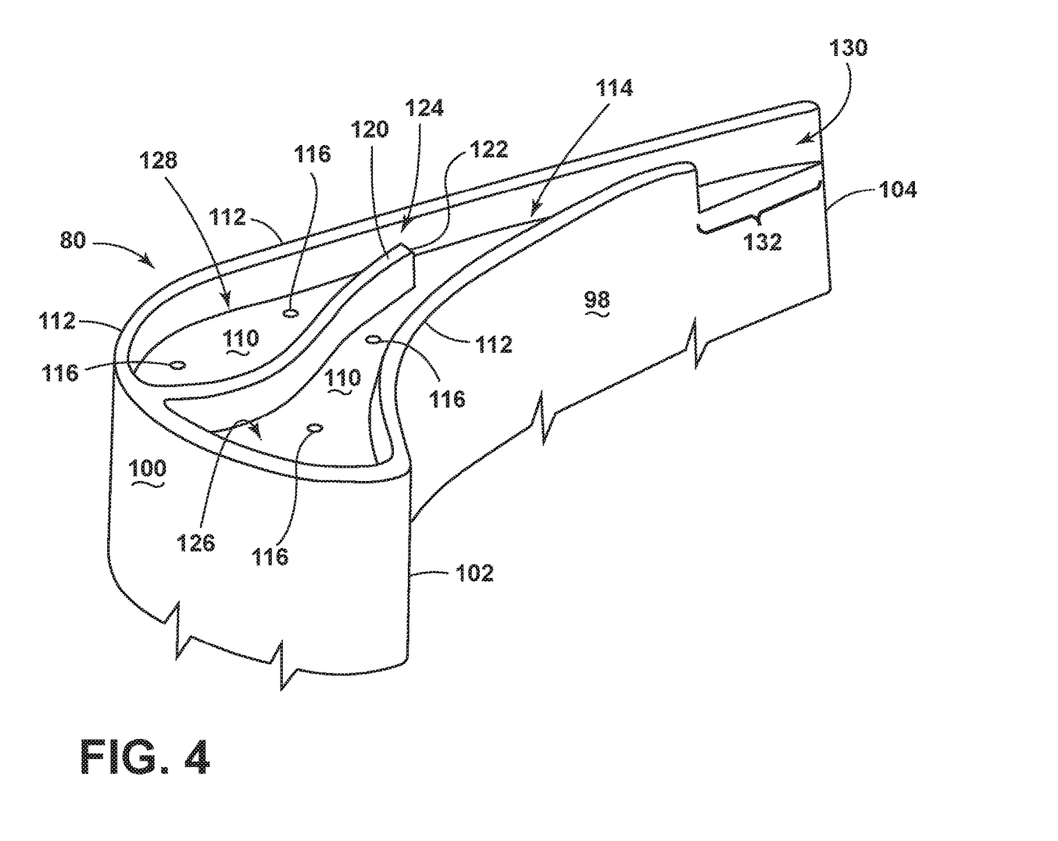
FIG. 4 is a top perspective view of a tip of the airfoil of FIG. 2.

Turning to FIG. 4, a top perspective view best illustrates the tip 80 having a tip floor 110 extending between the pressure and suctions sidewalls 98, 100. The pressure and suction sidewalls 98, 100 extend radially outward from the tip floor 110 to define a rib 112 disposed at least partially about the tip 80 to bound an area of the floor 110 defining a tip plenum 114. A plurality of film holes 116 can be disposed in the tip floor 110 fluidly coupling the interior 96 of the airfoil 78 to the tip plenum 114. Thus, the cooling airflow can be provided to the airfoil 78 from the passage outlet 94, fed through the interior 96 of the airfoil 78, and exhausted through the film holes 116 into the tip plenum 114.

A tip baffle 120 can extend radially outwardly in the span-wise direction from the tip floor 110 and be coupled to or integral with the suction sidewall 100 and can originate at the leading edge 102 toward the trailing edge 104. It should be understood, however, that the placement of tip baffle 120 is not so limited, and can originate at the suction sidewall 100, the pressure sidewall 98, the leading edge 104, or even the trailing edge 104, or among a combination thereof. Like the rib 112, the tip baffle 120 has a rectangular transverse cross section of similar width and height, with sides laterally facing the rib 112 on the corresponding pressure or suction sidewalk 98, 100. Alternatively, the rib 112 and the tip baffle 120 can have different transverse cross-sections, such as a square, quadrilateral, arcuate, curved, variable, unique, or otherwise in non-limiting examples. Furthermore, the a portion of the rib 112 or tip baffle 120 can have a taper in the span-wise direction toward the root 82. Such a taper can be linear or non-linear.

The tip baffle 120 can follow the camber line of the airfoil 78 or can deviate therefrom, for example, conforming chordally with the shape or profile pressure or suction sidewalls 98, 100. Alternatively, the tip baffle 120 can extend from the pressure sidewall 98. The tip baffle 120 terminates at a free end 122, being spaced from the rib 112 to define a baffle slot 124 as the space between the free end 122 and the rib 112. In defining the baffle slot 124, the space can be measured as the shortest distance between the free end 122 and the rib 112, such that the baffle slot 124 can be disposed between the free end 122 and either of the pressure sidewall 98 or the suction sidewall 100, depending on the position of the free end 122.

The tip baffle 120 bifurcates the tip plenum 114 between the bounding rib 112 into a first pocket 126 and a second pocket 128 adjacent to the pressure sidewall 98 and the suction sidewall 100, respectively. The first and second pockets 126, 128 can terminate at the free end 122 to define two baffle slots 124 between the free end 122 and the pressure and suction sidewalls 98, 100.

The rib 112 terminates in a tip slot 130 along the pressure sidewall 98 prior to the trailing edge 104. Thus, the rib 112 circumscribes the outer surface along the tip 80 except for a gap 132 defining the tip slot 130. The baffle slot 124 fluidly couples the first and second pockets 126, 128 to the tip slot 130. The tip slot 130 is in fluid communication with the tip plenum 114 and permits the exhausting of air within the tip plenum 114 through the tip slot 130 at the trailing edge 104. In an alternative implementation, the tip slot 130 can be disposed along the suction sidewall 100.

Figure 5:
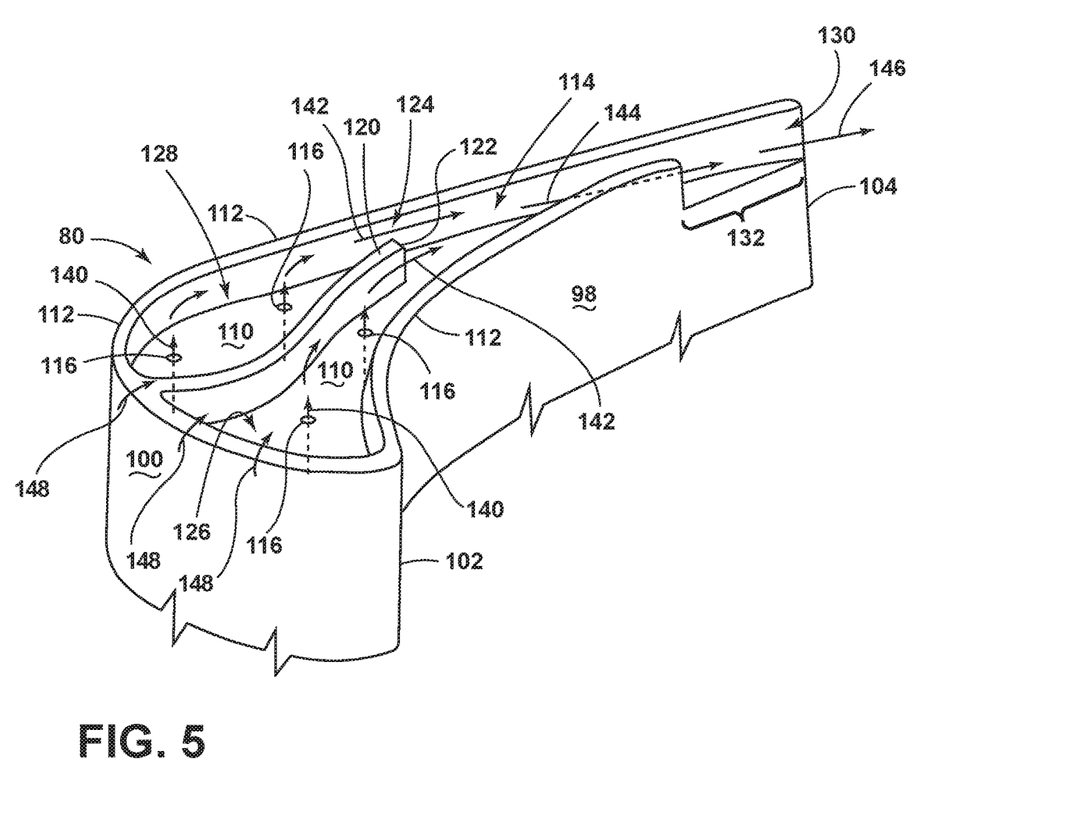
FIG. 5 is the top perspective view of FIG. 4 showing airflow movement within the tip of the airfoil.

Turning to FIG. 5, a flow of cooling air provided to the interior 96 of the airfoil 78 can be exhausted at the tip 80 through the film holes 116 disposed in the tip floor 110. The exhausted cooling air 140 enters into the tip plenum 114 and begins to flow toward the trailing edge 104 in an aft direction. Cooling air 142 within the tip plenum 114 can be divided into the first and second pockets 126, 128 and can join as a trailing edge cooling flow 144. The trailing edge cooling flow 144 moves toward the trailing edge 104 until it exhausts from the tip 80 through the tip slot 130 as an exhaust flow 146. It should be appreciated that the baffle slot 124 created by the free end 122 permits cooling fluid introduced through the film holes 116 near the leading edge 102 to travel to the trailing edge 104 within the tip plenum 114 and exhausting out the tip slot 130. As can be appreciated, the baffle slot 124 in combination with the tip slot 130 provides a path for the cooling air 140 to move along the tip plenum 114 without washing out over the rib 112.

As should be understood, the introduction of the tip baffle 120 can be used in specific designs for improving turbine efficiency as well as reducing leakage of the combustion gases over the tip 80 through a tip-shroud clearance.

Turbine efficiency is based on the ability of the airfoil surfaces to extract energy from the differential pressure in the combustion gases acting over the pressure and suction sidewalls 98, 100 of the airfoil 78 from root 82 to tip 80 and between the leading and trailing edges 102, 104. The introduction of the tip baffle 120 provides additional surface area at the tip 80 against which the tip flow can perform additional work on the airfoil 78. The tip baffle 120 also provides an additional seal, like the rib 112, for reducing tip flow leakage. Tip leakage includes both axial and circumferential directions of the airfoil tip 80. The gases engage the airfoil 78 around its leading edge 102 both in axial and circumferential directions due to the oblique inlet angle from an upstream vane.

It is desirable to place the tip baffle 120 to capture incident flow streamlines 148 over the forward portion of the rib 112 to funnel the flow within the tip pockets 126, 128. The leakage gases are funneled through the pockets 126, 128 to pressurize the pockets 126, 128 while being guided aft along the tip baffle 120. The pressurized pockets 126, 128 increase turbine efficiency by extracting additional energy from the tip baffle 120 and discourage further leakage over the tip 80 by the increased pressure therein. However, pressurizing the pockets 126, 128 utilizing the tip baffle 120 alone can cause cooling fluid fed from the interior 96 of the airfoil 78 to wash out without effectively cooling the tip 80.

While the tip baffle 120 reduces flow leakage, cooling fluid fed to the tip plenum 114 from the interior 96 of the airfoil 78 must exhaust somewhere. Utilizing the tip slot 130 in combination with the baffle slot 124 provides for fluidly coupling the tip plenum 114 to the aft exterior of the tip 80 to exhaust the cooling fluid fed to the tip plenum 114. Therefore, the washing of cooling fluid over the rib 112 is minimized to enhance cooling of the tip 80 while maintaining the efficiency improvements of the tip baffle 120. Thus, it should be appreciated that the tip baffle 120 having a baffle slot 124 in combination with the tip slot 130 provides for both improved efficiency and cooling of the airfoil 78 at the tip 80.

Figure 6:
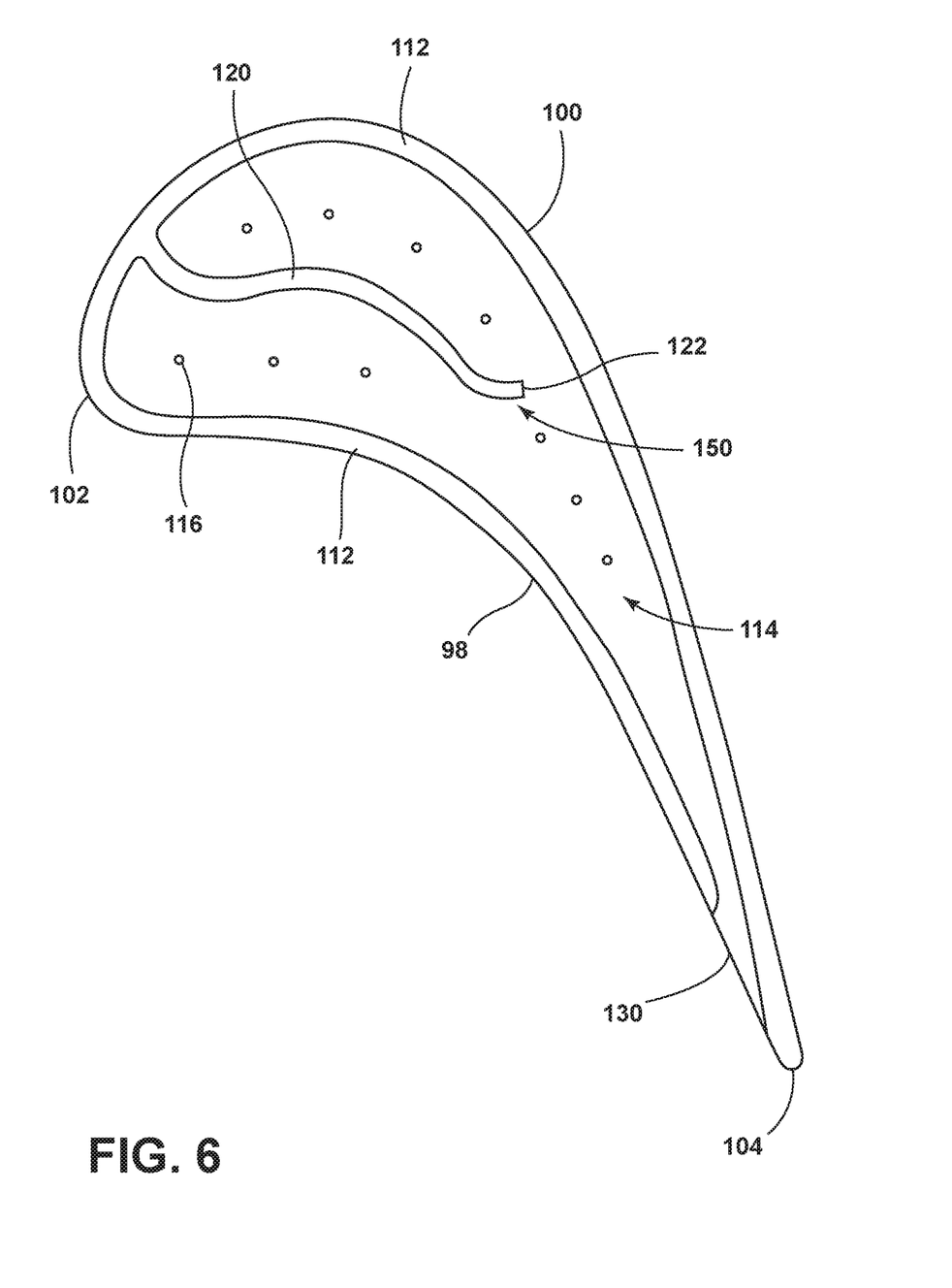
FIG. 6 is a cross-sectional view of the airfoil of FIG. 4 with a baffle curl toward a suction side of the airfoil.
Figure 7:
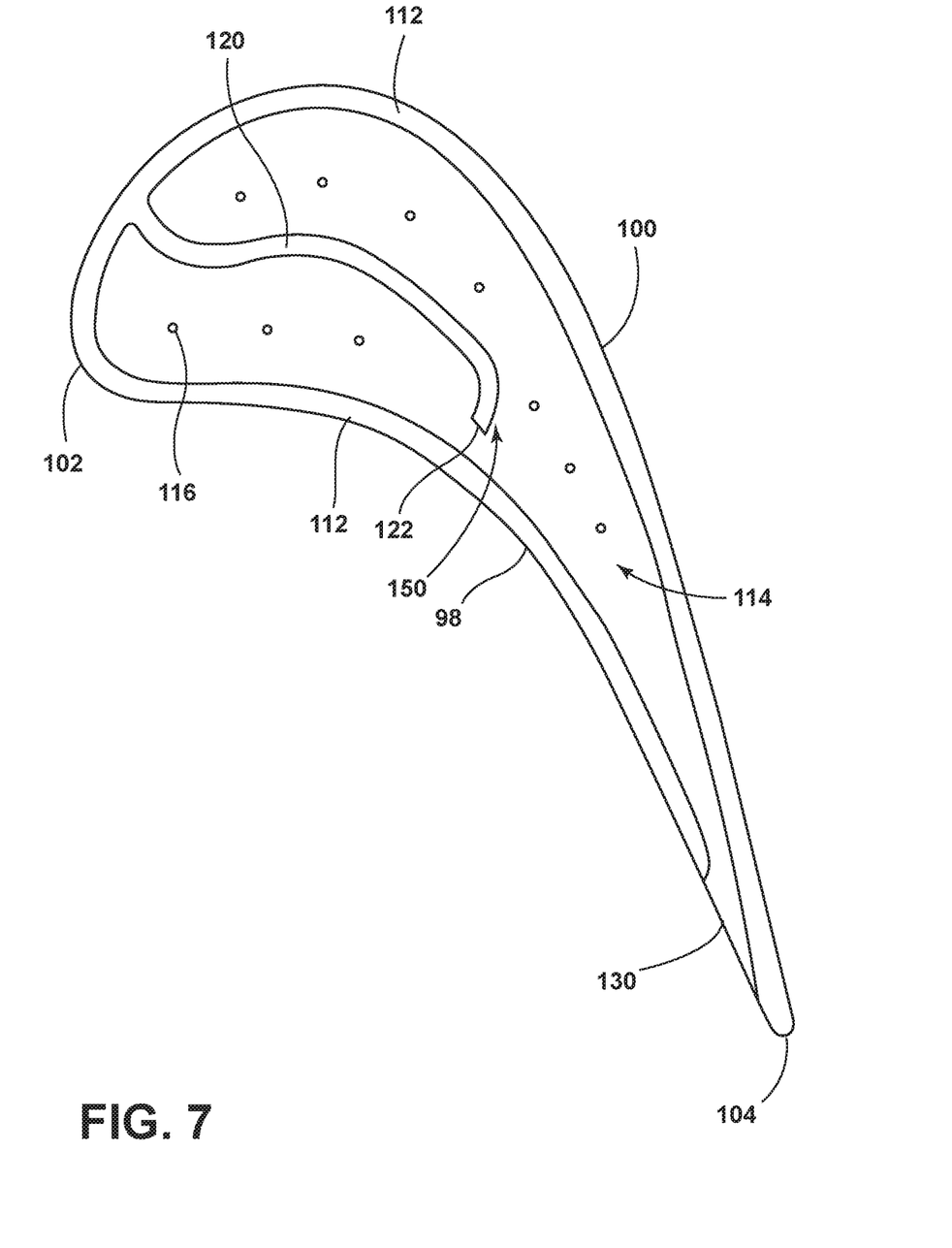
FIG. 7 is a cross-sectional view of the airfoil of FIG. 4 with the baffle curl toward a pressure side of the airfoil.

Alternatively, in FIGS. 6 and 7, the free end 122 can include a curl 150, such that the free end 122 terminates in a curvilinear manner toward either the pressure or suction sidewalls 98, 100. FIG. 6 illustrates the curl 150 at the free end 122 turning in a direction toward the suction sidewall 100. FIG. 7 illustrates the curl 150 at the free end 122 turning toward the pressure sidewall 98. It should be understood that the curl 150 can partially enclose the first or second pockets 126, 128, which can increase or decrease the pressure within the pockets 126, 128 as well as the rate or volume of cooling fluid flow moving downstream from the pockets 126, 128. As such, the curl 150 can be utilized to vary the flow rates from the pockets 126, 128 that can be used to provide increased cooling flows along portions of the airfoil tip 80 where more or less cooling may be required, or can be used to increase or decrease local pressure within the pockets 126, 128 to improve efficiency.

Figure 8:
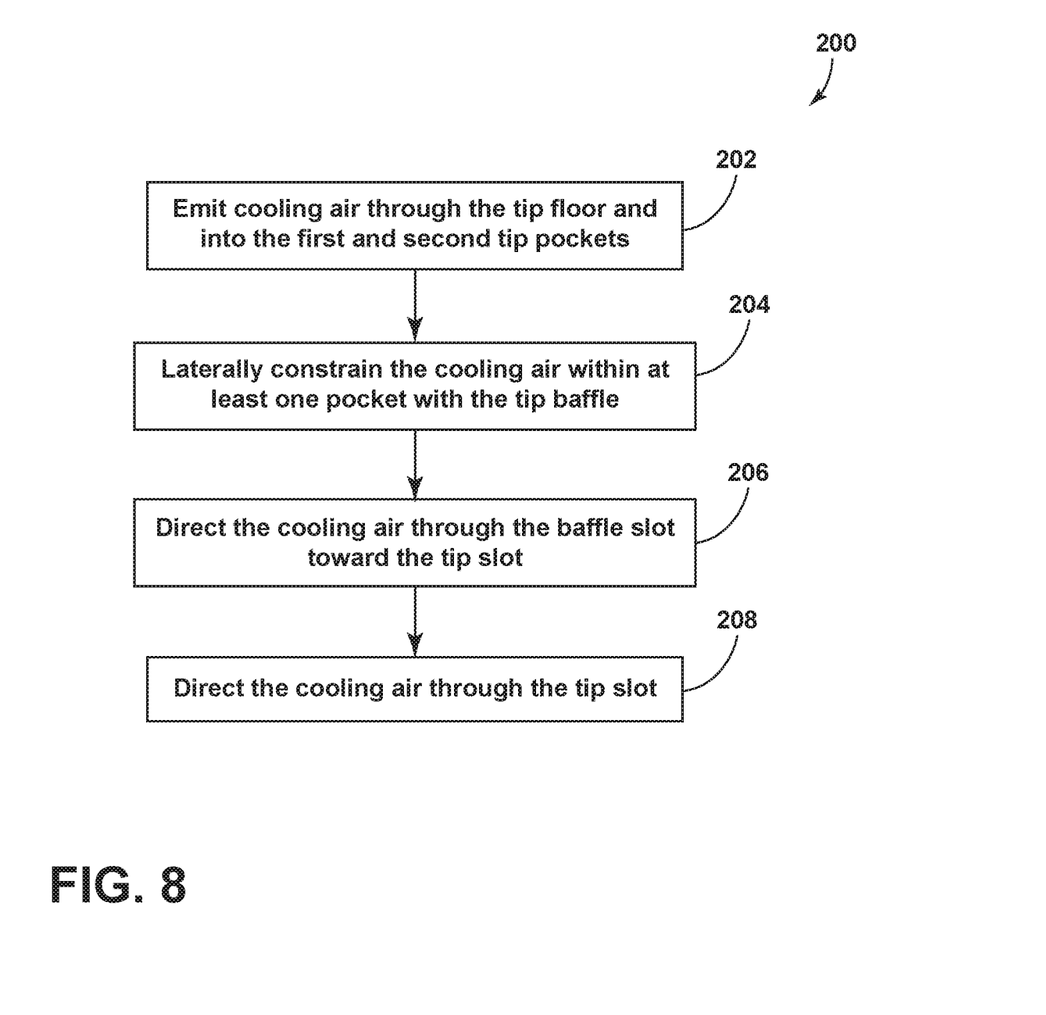
FIG. 8 is a flow chart illustrating a method cooling the tip of the airfoil.

Turning now to FIG. 8, a flow chart illustrates a method 200 of cooling the tip 80 of the airfoil 78 of a gas turbine engine 10. At 202, the method includes emitting cooling air through the tip floor 110 and into the first and second tip pockets 126, 128. The cooling air can be provided from the interior 96 of the airfoil 78 through the film holes 116 to the first and second pockets 126, 128. At 204, the cooling air is laterally constrained within the tip pockets 126, 128 by the tip baffle 120 projecting from the tip floor 110 and the rib 112 circumscribing the tip 80. Optionally, at 204, a curl 150 can direct the cooling air toward the pressure or suction sidewalls 98, 100 to provide additional cooling to the sidewalls 98, 100 as may be beneficial to the particular airfoil 78. At 206, the cooling air is direction through the baffle slot 124 toward the trailing edge 104 of the blade 68, approaching the tip slot 130. At 208, the cooling air is directed through the tip slot 130 and exhausted from the tip 80.

It should be appreciated that utilizing a baffle slot 124 in combination with the tip slot 130 minimizes the disruption of the flow of cooling fluid within the tip plenum 114. The baffle slot 124 provides a path for the flow of cooling fluid to move toward the trailing edge 104 and the tip slot 130 provides for exhausting of the cooling fluid. By minimizing the disruption of the cooling airflow, washing out of the cooling airflow over the rib 112 is reduced which improves tip cooling. Additionally, the pressures held within the pockets 126, 128 are maintained to improve airfoil efficiency, while moving the cooling air aft to maintain cooling of the tip 80. In reducing the tip temperatures in combination with utilizing the pockets 126, 128, durability as well as time-on-wing increases without sacrificing the efficiency gain of the tip baffle 120.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a gas turbine engine, the airfoil comprising:
   an outer surface bounding an interior and defining a pressure side and a suction side extending axially between a leading edge and a trailing edge to define a chord-wise direction and extending radially between a root and a tip to define a span-wise direction;
   the outer surface of the pressure side and suction side extending radially outward to define a rib projecting in the span-wise direction from a floor of the tip and extending in the chord-wise direction to at least partially bound an area of the floor to define a tip plenum;
a tip slot located in the rib near the trailing edge and fluidly coupled to the tip plenum; and
a tip baffle projecting in the span-wise direction from the floor of the tip and extending in the chord-wise direction within the tip plenum and forming at least one baffle slot with the rib;
wherein the baffle slot is fluidly coupled to the tip slot.

2. The airfoil of claim 1 wherein the tip baffle extends from the rib and divides the tip plenum into first and second pockets.

3. The airfoil of claim 2 wherein the at least one baffle slot fluidly couples at least one of the first and second pockets to the tip slot.

4. The airfoil of claim 3 wherein the tip baffle forms two baffle slots, which correspondingly fluidly couple the first and second pockets to the tip slot.

5. The airfoil of claim 2 wherein the tip baffle terminates in a free end spaced from the rib to define the at least one baffle slot between the free end and the rib.

6. The airfoil of claim 1 wherein the airfoil comprises at least one of a rotating blade or a stationary vane.

7. The airfoil of claim 6 wherein the airfoil comprises the rotating blade and has an integral dovetail.

8. An airfoil for a gas turbine engine, the airfoil comprising:
an outer surface bounding an interior and defining a pressure side and a suction side extending axially between a leading edge and a trailing edge to define a chord-wise direction and extending radially between a root and a tip to define a span-wise direction;
a rib projecting in the span-wise direction from a floor of the tip and extending in the chord-wise direction to at least partially bound an area of the floor to define a tip plenum;
a tip slot located in the rib near the trailing edge and fluidly coupled to the tip plenum; and
a tip baffle projecting in the span-wise direction from the floor of the tip and extending in the chord-wise direction within the tip plenum and forming at least one baffle slot with the rib;
wherein the baffle slot is fluidly coupled to the tip slot;
wherein the tip baffle extends from the rib and divides the tip plenum into first and second pockets;
wherein the tip baffle terminates in a free end spaced from the rib to define the at least one baffle slot between the free end and the rib; and
wherein the free end defines a curl directed toward at least one of the pressure side and the suction side.

9. The airfoil of claim 8 wherein the tip baffle extends from the leading edge toward the trailing edge, with the free end located upstream of the trailing edge.

10. The airfoil of claim 9 wherein the rib circumscribes the outer surface along the tip except for a gap at the trailing edge that forms the tip slot.

11. The airfoil of claim 10 wherein the tip baffle extends from the leading edge toward the trailing edge, with the free end located upstream of the trailing edge.

12. The airfoil of claim 11 wherein the tip baffle follows a camber line of the airfoil.

13. The airfoil of claim 12 further comprising film holes extending through the floor of the tip.

14. A method of cooling a tip of an airfoil of a gas turbine engine comprising:
emitting cooling air through multiple openings in a floor of the tip and into at least two pockets on the tip;
laterally constraining the cooling air within at least one of the pockets with a baffle projecting from the floor; and
directing the cooling air through a baffle slot toward a tip slot near a trailing edge of the airfoil.

15. The method of claim 14 wherein the directing comprises directing the cooling air toward one of a suction side and pressure side of the airfoil prior to the cooling air reaching the tip slot.

16. The method of claim 14 further comprising directing the cooling air through the tip slot.

17. An airfoil for a gas turbine engine comprising a tip having a tip plenum where an outer surface of a pressure side and a suction side extend radially outward to define a rib projecting in a span-wise direction from a floor of the tip and extending in a chord-wise direction to at least partially bound an area of the floor to define the tip plenum with an aft tip slot fluidly coupling the tip plenum to an exterior of the airfoil, and a tip baffle forming at least two pockets within the tip plenum and having a baffle slot fluidly coupled to the tip slot.

18. The airfoil of claim 17 wherein the airfoil comprises at least one of a rotating blade or a stationary vane.

19. The airfoil of claim 18 wherein the airfoil comprises the rotating blade having an integral dovetail.

20. An airfoil for a gas turbine engine comprising a tip having a tip plenum with an aft tip slot fluidly coupling the tip plenum to an exterior of the airfoil, and a tip baffle forming at least two pockets within the tip plenum and having a baffle slot fluidly coupled to the tip slot;
wherein the tip baffle terminates in a free end that defines a curl directed toward at least one of a pressure side and a suction side of the airfoil.

21. The airfoil of claim 20 wherein the tip baffle extends from a leading edge toward a trailing edge, with the free end located upstream of the trailing edge.

22. The airfoil of claim 21 further comprising a rib circumscribing a tip floor except for a gap at the trailing edge that forms the tip slot.

23. The airfoil of claim 17 wherein the tip baffle follows a camber line of the airfoil.

24. An airfoil for a gas turbine engine comprising a tip having a tip plenum with an aft tip slot fluidly coupling the tip plenum to an exterior of the airfoil, and a tip baffle forming at least two pockets within the tip plenum and having a baffle slot fluidly coupled to the tip slot;
further comprising a tip floor having film holes extending through the tip floor.

* * * * *